T. M. SMITH.
LIFTING APPARATUS.
APPLICATION FILED MAY 18, 1908. RENEWED MAR. 2, 1909.

935,170.

Patented Sept. 28, 1909.
6 SHEETS—SHEET 1.

Attest:
Edwd L. Tolson.
Bent M. Stahl.

Inventor:
Thomas Marshall Smith,
By Spear, Middleton, Donaldson & Spear
Attys.

T. M. SMITH.
LIFTING APPARATUS.
APPLICATION FILED MAY 18, 1908. RENEWED MAR. 2, 1909.

935,170.

Patented Sept. 28, 1909.
6 SHEETS—SHEET 3.

T. M. SMITH.
LIFTING APPARATUS.
APPLICATION FILED MAY 18, 1908. RENEWED MAR. 2, 1909.

935,170.

Patented Sept. 28, 1909.

Attest:
L. Tolson
Bent. M. Stahl.

Inventor:
Thomas Marshall Smith,
By Spear, Middleton, Donaldson & Spear
Attys.

T. M. SMITH.
LIFTING APPARATUS.
APPLICATION FILED MAY 18, 1908. RENEWED MAR. 2, 1909.

935,170.
Patented Sept. 28, 1909.
6 SHEETS—SHEET 5.

Fig. 18.

Attest:
Ed L. Tolson
Bent. M. Stahl

Inventor:
Thomas Marshall Smith
By Spear, Middleton, Donaldson & Spear
Attys.

UNITED STATES PATENT OFFICE.

THOMAS MARSHALL SMITH, OF BALTIMORE, MARYLAND.

LIFTING APPARATUS.

935,170.

Specification of Letters Patent. Patented Sept. 28, 1909.

Application filed May 18, 1908, Serial No. 433,469. Renewed March 2, 1909. Serial No. 480,972.

*To all whom it may concern:*

Be it known that I, THOMAS MARSHALL SMITH, a citizen of the United States, residing at Baltimore, Maryland, have invented certain new and useful Improvements in Lifting Apparatus, of which the following is a specification.

My invention herein described is designed to lift, support and move invalids, with safety, convenience and without discomfort or alarm.

I have fully described herein the general structure and the details, as well as the uses and adaptations, and in the claims specified what I regard as of my own invention.

The structure is illustrated in the accompanying drawings, in which:—

Figure 1 is a central vertical sectional view of the invention with parts in elevation. Fig. 1ª is a view of a detail. Fig. 2 is a plan view of the turn table or support for the frame or beam which supports the invalid. Fig. 3 is a detail view of a supporting leg for the apparatus. Fig. 19 is a detail view of the locking means. Figs. 24 and 25 show another form of truck.

In the drawings, A represents the base of the apparatus. It is of substantial size and weight, contains the lifting mechanism proper, and holds also the plunger rod which forms the upper part of the standard which carries the arm that directly supports the weight of the patient.

Omitting for the present further reference to the base and power producing means therein, I point out that the plunger B rises from the base and carries an arm C. The plunger is preferably the piston of a hydraulic lifter; is round and moves vertically or turns in the base. The arm C is of T iron held with its central web, in vertical plane, in a bracket bolted to the plunger or standard. In further bracing against the strains, sometimes heavy, I tie the free end of the arm to the top of the standard by rod 2. Upon this arm is carried the support for the patient, in such manner as to provide for the freest movements, rotary on the arm carriage and longitudinal of the carriage on the arm. The first movement is the elevation of the plunger carrying the patient and the direct supports for the patient connected with the arm.

The carriage 3 is suspended upon a pair of wheels which run on the horizontal flange of the arm. To this carriage is connected the part which controls the patient, holds him from tipping in any direction and yet permits free movement both rotary and longitudinal. This part may be varied in form, but is maintained under all circumstances in substantially the same horizontal plane. A very simple and effective form is shown in the drawings. A steel beam D of T form is pivotally connected at its center with the underside of the carriage. The carriage is snugly held on the arm by anti-friction rollers 5—5, so that it may move freely but cannot tip and the beam D is swiveled on the carriage underneath by a fifth wheel construction which permits the turning of the beam, to any extent in a horizontal plane, but prevents tipping, and the patient is held comfortably and securely. A variety of different supports is required for different patients or different conditions of the same patient. Sometimes the patient needs the support of a bed, such as an ordinary stretcher Fig. 18, with rigid side bars. Sometimes he requires a series of straps Fig. 17 and sometimes may be better held in a sitting position by a simple broad band. But the same security is afforded by the frame, the lateral extent of which is ample for all the conditions named and the length of which is equal substantially to that of the bed frame of the support with rigid sides first mentioned. All these conditions are met by a simple arrangement of cross bars E, adjustable on the beam D. These bars are of steel of the form of T iron and are in length substantially equal to the width of the bed frame or direct patient support. They are pivoted to blocks 8, which slide on the horizontal flanges of the beam D and are provided with set screws 9 by which the cross bars may be fixed on the beam at desired points. The central cross bar E' is connected to the main beam D between the depending arms 10 of the turn table or fifth wheel. When a bed form of direct support is used the chains one for each end of each cross arm are connected thereto by snap hooks Fig. 17. This, as is well known, may be made separate so as to be put under the patient lying on an ordinary bed, and when the connections are made the lifting power is applied and the patient lifted and supported on the movable bed. If the apparatus be at the head of the ordinary bed the patient may be swung into various positions, as for example, in front of a window. It will be observed that the whole weight is borne upon the beam which is held firmly on the fifth wheel or turn table and therefore cannot tip even if the patient be placed out of center of the line of support. In like manner it operates when supporting the patient by a single or multiple bands Fig. 17 as the direct supporting means. The bands or the bed form of direct support for the patient being arranged underneath him, the frame is turned into position and the flexible connections with their means of attachment and detachment are applied. Then the attendant operates the lifting power by foot pressure, while his hands are free to handle the patient. The arms 10 of the fifth wheel or turn table afford bearings or connections between the turn table and the horizontal beam at separated points diametrically opposite each other in respect to the turn table, distributing the strain and rendering the construction capable of resisting any twisting strain in any direction to which the parts may be subjected by the preponderance of weight being first at one point under the beam and then at another.

The support 3 is composed of the upper part supported on the arm C and which is preferably, though not necessarily, arranged to travel thereon, and the lower turning part. The upper part is composed of two sections 11 and 12 divided from each other vertically and located upon opposite sides of the arm C. Each of these sections has a post 13 for one of the track wheels 14 and each has a semicircular socket 15 which, when the two sections are brought together provides a complete socket for receiving the head or swivel 16 of the lower section of the support, this lower section constituting the turn table, it having an elongated plate 17 to bear on the underside of the support 3. The sections 11 and 12 of this support 3 are held together by bolts 18 and the base part 19 of this support furnishes the member or plate circular in form against which the turn table works. The head of this turn table lies closely beneath the bottom surface of the beam C. The carrier or support 3 is further provided with rollers 5' bearing on the underside of the arm C, thus maintaining the support against tipping or displacement, while at the same time permitting it freedom of movement. The rollers 5, 5 prevent lateral displacement by bearing against the side edges of the beam. The arms 10 which reach down from diametrically opposite points from the turn table are provided with alined openings of substantially the same shape as the cross sectional shape of the beam D and this beam is fixed rigidly in these arms by employing a filling of Babbitt metal between the angle iron beam and the wall of the opening in the hanger or arm 10. By use of these arms or of the turn table having connection with the beam D at diametrically opposite points or along its diameter and by the use of the turn table which gives a broad swivel bearing, I am enabled to place the weight at any point along the beam, the patient, sitting, lying flat or being in a recumbent position, without strain upon the support connected with the arm C.

The blocks 8, which hold the cross arms E, are provided with fingers 20, grasping the flanges of the beam D. These blocks have each a socket 21, which receives the head 22, of a hanger 23, which is provided with an opening 24 angular in cross section to correspond with the cross sectional shape of the cross arm, which arm is fixed therein by babbitting. The head 22 is not of complete circular form, having opposite edges straight and parallel, to fit between the pairs of fingers 20, after which, by turning the hanger 23, the head 22 will take under the fingers 20, and lie in the socket in the block 8, so as to turn therein to adjust the cross arm to any desired angle in relation to the supporting beam D, it being understood, however, that the cross arm can be adjusted only in a horizontal plane. The head 22 of the hanger 23 fits snugly beneath the lower face of the beam D.

Figure 16:
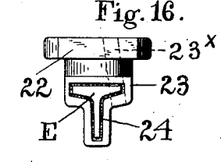

The support, or carriage 3 may be set in any desired position by the hand screw 9, and the cross arms may be set in any desired position along the beam D and at any desired horizontal angle thereto by a hand screw 26. This screw passes through the hanger 23 and through the head thereof to bear against the underside of the beam D, the opening for the screw being shown at 23ˣ, Fig. 16. By turning this screw the head will be held from turning in the block 8 and the block 8 will be held against movement along the beam D.

Reverting to the standard or plunger B, this moves vertically in a cylinder F screw-threaded at its lower end into a block or support 26 which is bolted at 27 to the base A. Within the cylinder moves the piston 28, which is swiveled at 29 to the lower end of the plunger so that said piston will accommodate itself to any irregularities in the bore of the cylinder. The cylinder is braced above its point of connection with the base by means of a shell or casing 30, held by the bolts 27 to the base, the block or support 26 being bolted between this shell and the base.

Figures 1, 1A, 2, 3, 19:
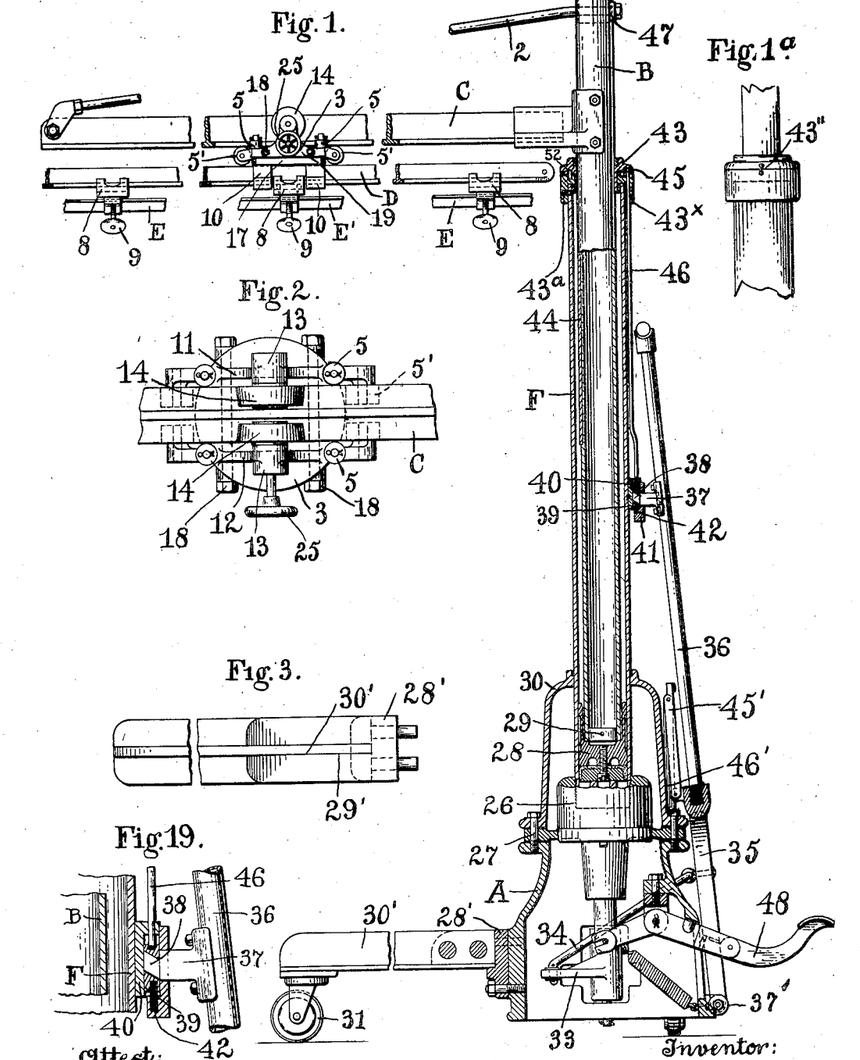
Figures 4, 5, 6, 20, 21, 22, 23:
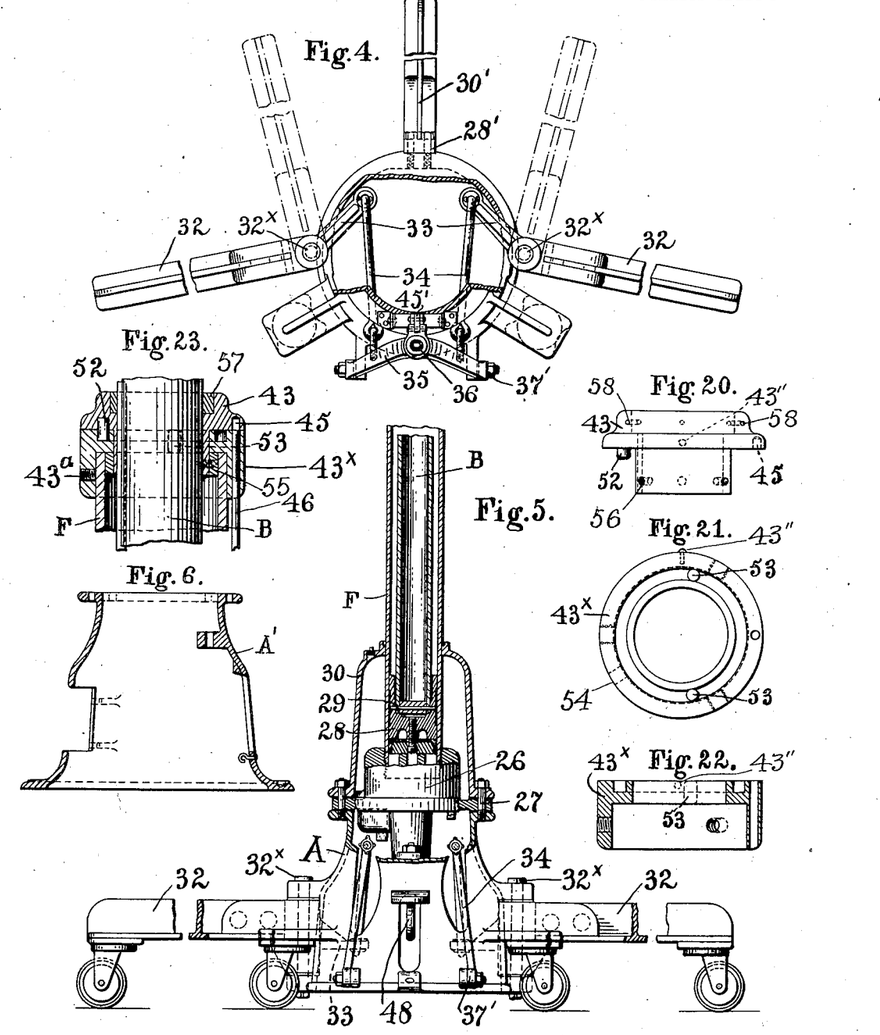
Fig. 4 is a plan view of the apparatus with parts in section and parts omitted.
Fig. 5 is a view similar to Fig. 1 a quarter turn therefrom.
Fig. 6 is a detail view of the stationary base with which my apparatus may be used.
Figs. 20, 21, 22 and 23 and 26 are views of details.
Figure 7:
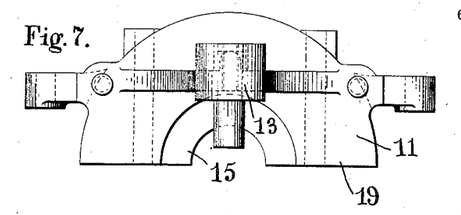
Fig. 7 is a plan view of one section of the support or hanger for the frame or beam from which the invalid is supported.
Figure 8:
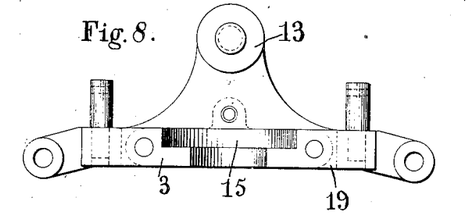
Fig. 8 is a side view of the member shown in Fig. 7.
Figure 9:
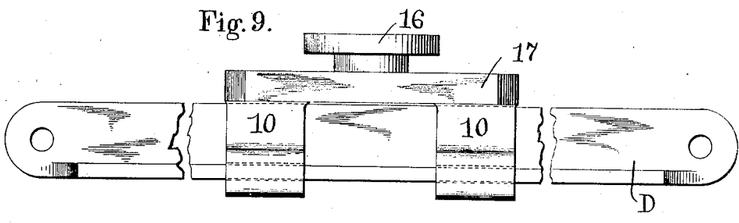
Fig. 9 is a side view of the turn table member adapted to be supported in a pair of members such as shown in Fig. 7.
Figure 10:
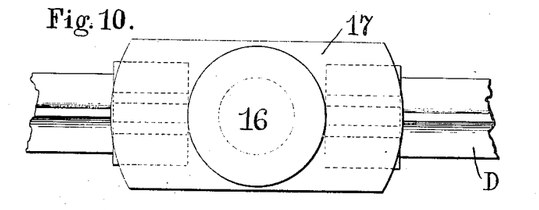
Fig. 10 is a plan view of the parts shown in Fig. 9.
Figure 11:
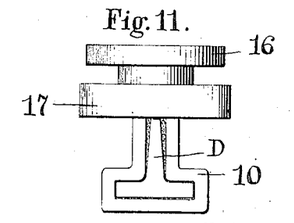
Fig. 11 is an end view of the parts shown in Fig. 10.
Figure 12:
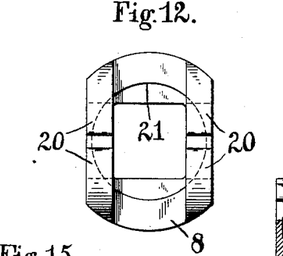
Figs. 12, 13 and 14 are detail views relating to the block for supporting the cross arms.
Figure 13:
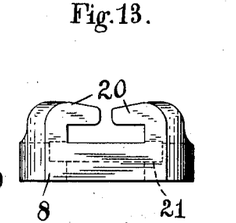
Figure 14:
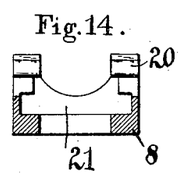
Figure 15:
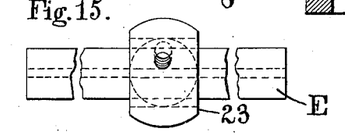
Figs. 15 and 16 are detail views of the swivel support or head to which the cross arm is fixed.

The base A has bolted thereto a casting 28', the arm of which is slotted at 29' to receive the upright flange 30' of an angle iron leg which carries a caster wheel 31. The base has pivoted thereto at diametrically opposite points to swing in a horizontal plane a pair of legs 32, these being located about 90° distant from the fixed leg. These swinging legs are composed of castings or brackets adapted to receive the angle iron member of the leg like the fixed leg above described, and in addition they have each an extension 33, to which a link 34 is pivoted, connecting the swinging leg directly to the arms of a fork 35 of a handle or lever 36, the said fork being pivoted at 37' to the base. The lever 36 when in the upright position of Fig. 1 holds the legs in extended position, as shown in Fig. 4. In this position the lever will be retained by a catch 37 thereon, which is provided with an inclined end 38 adapted to fit an opening in a bolt 39 which slides in a casing composed of two sections 40 and 41, the said bolt being pressed upwardly by a spring 42. When the legs are in extended position, they afford widely separated bearing points which will hold the apparatus firmly against tipping in any direction, no matter in what position the arm C, together with the plunger B may be turned in relation to the main frame or base, and while this arm C is free to be turned into any angular position in a horizontal plane, the legs will be held locked in their extended position, excepting when the arm C is turned into a position in the same vertical plane with the fixed leg 30'. In other words, the turning of the arm C controls the lock of the hand lever and consequently of the movable legs, and for this purpose I provide a collar or head 43 at the top of the cylinder F, said head being splined to the standard or plunger B to rotate therewith, the spline key being indicated at 44. This collar does not rise or fall with the plunger, but merely turns on the cylinder head 43ˣ fixed at 43ᵃ to the cylinder. It is provided with an opening at 45 adapted to coöperate with the upper end of the rod 46, guided in the cylinder head which rod connects with the bolt 39 above described for controlling the locking or unlocking of the hand lever, and this head or collar also controls the locking or unlocking of the rotary standard B to prevent or allow the movement of the arm C in a horizontal plane. When the arm C is moved to a position in the same vertical plane with the fixed leg, the opening in the collar is presented to the locking rod and said rod will move upwardly to engage the said opening and thus lock the arm C in this position, so that the center of gravity is at some point in the same vertical plane in which the fixed leg extends. The locking of this arm C in this position results at the same time with the unlocking of the hand lever so that this may now be swung downwardly to fold the movable legs from their extended position to the position indicated in dotted lines in the plan view of the drawings, and when in this position the apparatus may be moved about in the ward or from room to room through a comparatively narrow door way, and although the bearing points of the base upon the floor will not be so widely separated as before, the said bearing points will be positioned in such relation to the definitely determined position of the weight of the person supported from the locked arm C that ample security will be afforded against tipping of the apparatus. Now, when the apparatus has been moved to the desired position and it is necessary or des'rable to move the arm C in a horizontal plane it will be necessary first to lift the lever 36 to its upright position in order that its inclined catch will act against the sliding bolt and draw the same downwardly, together with the locking rod so as to release the said rod from the rotatable head 43, and this upward movement of the hand lever will immediately extend the folding legs to their widely separated positions. Now, as soon as the arm C has been adjusted however small a distance to either side of the vertical plane of the rigid leg, the solid portion of the head or plate 43 will bear upon the upper end of the locking rod 46 and keep the same pressed downwardly to maintain the locking bolt in proper position to retain the operating lever in its uppermost position and consequently with the folding legs extended. The hand lever is connected by the links 45'—46' with the base, the said links being pivotally connected together and pivoted to the lever and to the base.

At the point where the rod 2 passes through the upper end of the plunger or standard B, I place a reinforcing head or block 47.

I may employ any suitable form of hydraulic lifting apparatus arranged in the base, my present invention not being limited in this respect and this hydraulic lift may be operated through a lever 48.

It will be observed that the cylinder extends a considerable distance above the upper end of the hand lever to furnish an elevated support for the standard, and this is rendered possible while at the same time the lock for the lever is provided, by means of the elongated rod 46 extending from the locking bolt to the head or collar of the cylinder. The lever when turned downwardly may be used for pulling or pushing the apparatus from place to place, and this is rendered stable and the power supplied is distributed by means of the jointed link 45'—46'.

The apparatus may be set up on the floor and fixed in relation to the couch or bed, for which purpose it may have a stationary base instead of a rolling base as illustrated.

The block 26 is intended for use with any form of base either fixed or movable, and for this reason the block is removably connected with the base and it carries the cylinder of the elevating mechanism. The upper casing may also be used with any suitable form or base. I show in Fig. 6 a stationary form of base A' which may be used interchangeably with the movable form of base shown in the other figures.

Figure 17:
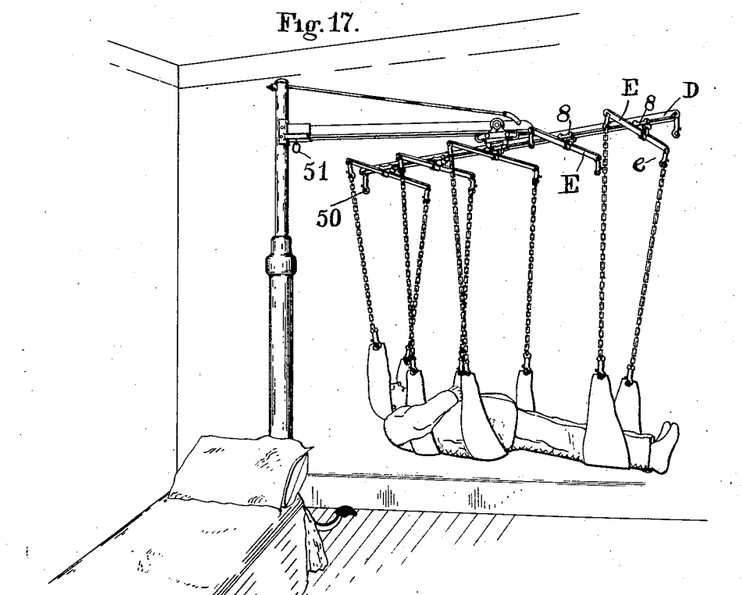
Fig. 17 is a perspective view of the apparatus with one of several forms of direct supports for the patient.
Figure 18:
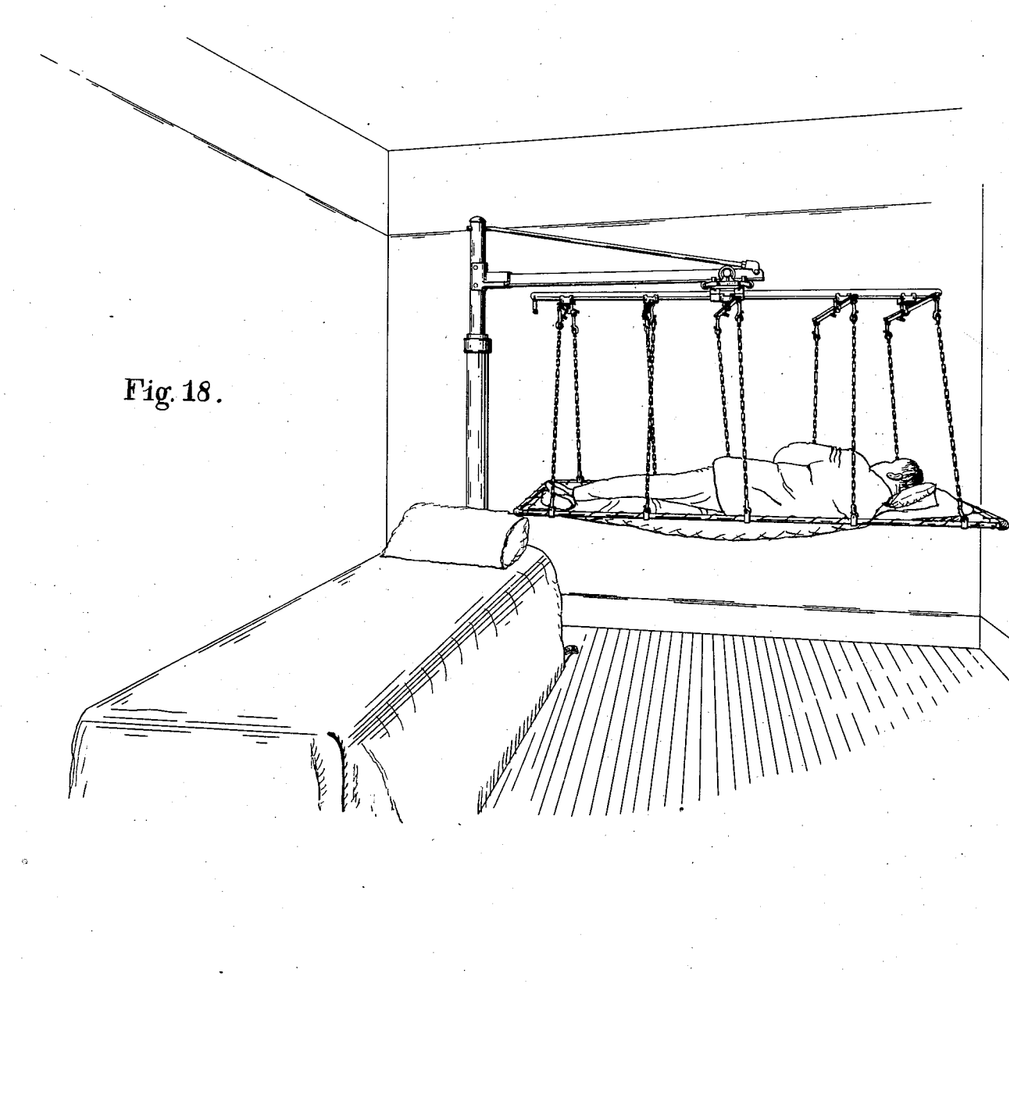
Fig. 18 is another view of the apparatus.

The beam D may be held rigidly to the arm C if it is desired for any purpose to prevent the beam from swinging in a horizontal plane, and for this purpose I provide a snap hook 50 on the end of the beam D adapted to engage a ring 51 secured to the arm C or its bracket as indicated in Fig. 17. By adjusting the block or carriage support 3 along the arm C, the snap hook 50 can be engaged with the ring and the beam D with its supporting means held rigidly in relation to the arm C.

It will be understood that any form of extensible or folding supports or legs may be used and I do not limit myself to the pivoted form of these extensible or collapsible supporting means.

The structure which I have called a turn table is not in the ordinary form of a turn table, and by this term I mean a structure accomplishing the functions of the device which I have described.

In order to aid in centering the arm C in respect to the fixed leg and to quickly bring these parts in such relation that the opening at 45 will aline with the locking bolt 46, I provide registering marks or pins at 43'' on the collar 43 and cylinder head 43ˣ, so that the attendant by simply bringing these marks into registering position by turning the arm C will be enabled to quickly adjust the machine in position to then draw down the handle and transport the apparatus from place to place. In order to limit the horizontal movement of the arm C so that it will not swing past the vertical planes in which the folding legs lie when in extended position, I provide a stop pin 52 on the collar 43 which extends down into a groove in the head 43ˣ which is secured to the cylinder and in this groove I place two stop pins 53 which limit the rotary movement of the splined collar 43, and consequently of the horizontal arm C.

I show at 54, Fig. 21, an opening in the cylinder head through which access may be had to the interior thereof for fastening a collar 55 on to the depending central portion of the collar 43 as shown in Fig. 23, screws being used to fasten this collar 55 in place which screws are threaded into openings in the collar 43 at 56 Fig. 20. I indicate this screw in dotted lines Fig. 23 though slightly displaced for convenience of illustration. The hole 54 may be plugged up after the parts are secured together. I also show a bushing at 57 Fig. 3 which may be held in place within the collar 43 by pins inserted through the holes 58, Fig. 20.

The treadle 48 is pointed at 48ˣ whereby it may be swung up out of the way.

Figure 24:
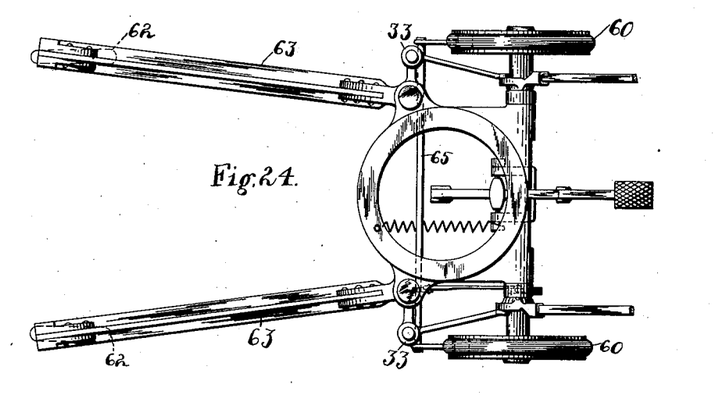
Fig. 24 is a top plan view showing the relations of the wheels and axle and the pivoted legs.

In the form of truck on which the apparatus is supported and moved, I provide a pair of wheels 60, mounted on an axle 61 and arranged outside of the base so that wheels larger and more easily moving than the ordinary caster wheels may be used. The axle forms a fixed support on one side and affords a base equal to the length of this axle. The other two wheels 62, 62 are mounted on legs 63, 63, which are pivoted to the base to swing in horizontal plane so that these legs may be swung in to the position shown in Fig. 24, when the apparatus is to be moved or outward to enlarge the base when the lifting mechanism is used. The wheels 63 are swiveled as casters. The pivoted ends of the legs 63 are provided with the extensions 33 connected to the handle in the same manner and with the same effect as in the form heretofore described.

Figures 25, 26:
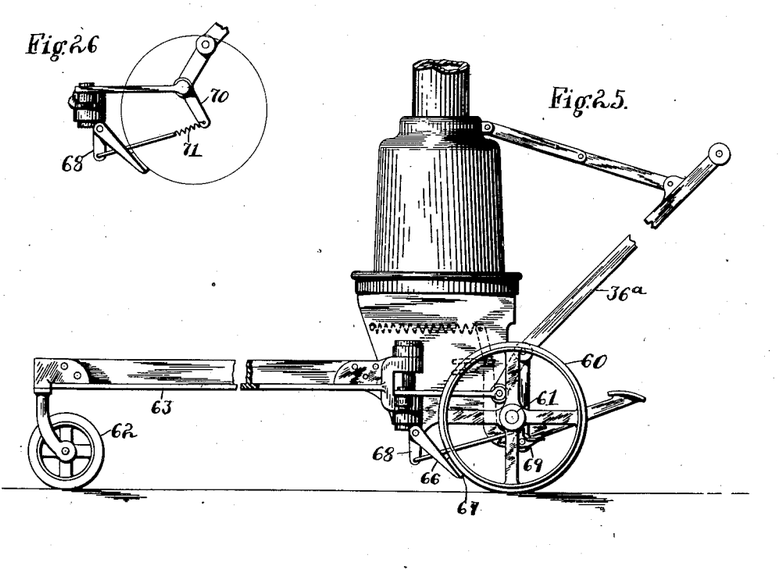
Fig. 25 shows a side elevation of the same with the base and operating lever.

A brake shaft 65 is mounted in the base and at its ends has fixed thereon arms 66, carrying brake shoes 67. This shaft has an intermediate fixed arm 68 connected to a bell crank lever 69 on a fixed pivot, one arm of the lever being arranged to be operated by the foot of the attendant in applying the brake and with the legs thus pivoted they may be spread to pass under the cot without interfering with the ventilator or the fixture under the bed, and at the same time by motion of the foot the apparatus may be arrested and held in place. This brake may be also operated automatically as illustrated in Fig. 26 in which the arm 68 is connected with an extension 70 of the handle 36ª through a spring 71. With this arrangement the lifting of the handles to spread the legs at the same time and movement puts on the brakes and as the handles are locked in place the brake is locked by the same mechanism.

I claim as my invention:

1. In combination in a lifting apparatus for invalids, a standard, an arm thereon arranged to turn in a horizontal plane, a block or carriage on said arm, a turn table swiveled on said block or carriage, a frame rigidly connected to said turn table, and a direct support for the patient connected with the said frame.

2. In combination in a lifting apparatus, a vertically movable standard, an arm thereon arranged to move in a horizontal plane, a movable block on the said arm formed in sections, rollers on the sections bearing respectively on the upper, lower and sides of the arm, and means for holding the sections together, a supporting beam below the arm, and a turn table connection between the supporting beam and the block, substantially as described.

3. In combination with the standard, a horizontal arm, a block on said arm formed in sections, each having a portion of a socket formed therein, means for clamping the sections together, a support below the arm for the invalid, and a turn table having a swiveled head held in the socket formed between the sections of the block, substantially as described.

4. In combination in a lifting apparatus with the standard, a horizontal arm, a horizontal beam below said arm, and swiveled thereto to turn only in a horizontal plane, cross arms supported on the beam and having adjustment in a horizontal plane in relation thereto, and means for supporting the patient suspended from said cross arms, substantially as described.

5. In combination in a lifting apparatus with the standard, a horizontal arm, a horizontal beam below said arm and swiveled thereto to turn only in a horizontal plane, cross arms supported on the beam and having movement in a horizontal plane in relation thereto, and means for supporting the patient suspended from said cross arms, said cross arms having adjustment longitudinally of the beam, substantially as described.

6. In combination with a standard and its horizontal arm, a block on said arm, a beam below the arm, and a swiveled connection between the block and the beam consisting of a turn table having a head, the head of said turn table fitting close beneath the bottom of the horizontal arm, substantially as described.

7. In combination, the standard, the horizontal arm, the beam below said arm, a turn table having pivotal connection with the arm and having a depending support in which the said beam is rigidly fixed, substantially as described.

8. In combination, the standard, a horizontal arm thereon a beam below said arm, a swivel connection between the said beam and said arm permitting said beam to turn only in a horizontal plane, a block on the beam, and a cross arm with a hanger having its end fitting in a socket in the block beneath the beam, substantially as described.

9. In combination, the standard, a horizontal arm thereon a beam below said arm, a swivel connection between the said beam and said arm permitting said beam to turn only in a horizontal plane, a block on the beam, a cross arm with a hanger having its end fitting in a socket in the block beneath the beam, and a hand screw for setting the block at different points along the beam and for preventing swiveling movement of the hanger, substantially as described.

10. In combination, the standard, a horizontal arm thereon, a beam beneath the horizontal arm swiveled thereto and movable only in a horizontal plane, said beam being of angle iron, blocks having fingers engaging the horizontal flanges of the beam, cross arms, and a swiveled connection between said cross arms and blocks, substantially as described.

11. In combination with the standard, a cylinder in which said standard is adapted to move vertically and rotate, a piston swiveled to the standard and fitted to the cylinder, a horizontal arm on the standard, means carried thereby for supporting the patient, and means for raising and lowering the standard in the cylinder, substantially as described.

12. In combination, the standard movable vertically and adapted to rotate, a cylinder in which said standard is arranged, a head or collar rotatable on the cylinder and splined to the standard, extensible legs, a lever having connection with said legs, a locking bolt for the lever, and a rod extending upwardly from said locking bolt to the rotatable head to be controlled thereby and in turn to control the said head, substantially as described.

13. In combination with the cylinder, a standard movable vertically and rotatable therein, a base, extensible legs on the base, a lever, and links extending from the said lever to the extensible legs directly, substantially as described.

14. In combination, the standard, a cylinder in which the same moves vertically and rotatably, an arm on the standard, supporting means for the patient carried by the said arm, extensible legs for supporting the cylinder, a lever forked at its lower end, and link connections between the arms of said fork and the extensible legs, substantially as described.

15. In combination, the base, the cylinder, the standard, vertically movable and rotatable therein, a horizontal arm on the standard for supporting the patient, extensible legs on the base, a lever connected with the extensible legs, and a jointed link connection between the lever and the base, substantially as described.

16. In combination with the standard, supporting means therefor, means for raising and lowering the standard, a horizontal arm on the standard, a beam swiveled to the horizontal arm to turn only in a horizontal plane, a series of cross arms on the beam individually movable pivotally in relation to the beam, and direct supporting means for the patient suspended from said cross arms, substantially as described.

17. In combination, a vertically movable standard, supporting means therefor, an arm extending from the standard, a beam, a swiveled connection between the beam and the arm, consisting of the turn table, depending supports from the turn table in which the beam is fixed, said supports being at separated points, a cross arm, and a support therefor connected with the beam between the separated supports thereof, substantially as described.

18. In combination, a base, a vertically movable standard, carrying a horizontal arm, a hand lever by which the said base may be drawn or pushed about, and a foot lever connected with the elevating mechanism of the standard, said foot lever being arranged on the same side of the base as the hand lever, substantially as described.

19. In combination, a base, a vertically movable standard, a hand lever forked at its lower end and attached to the base for moving the same about, and a foot lever passing between the arms of the fork of the hand lever, and connected with the elevating mechanism of the standard, substantially as described.

20. In combination in a supporting apparatus for invalids, a base portion, a horizontal arm or extension with means for supporting the same from the base to permit the said arm to be set in different angular positions in relation to the base, folding supports or legs, and means for preventing the folding of the said supports or legs, except when the horizontal arm is in a predetermined position relative to the supporting base, substantially as described.

21. In combination in a lifting and supporting apparatus for invalids, a base, a rotary standard supported therein and adapted to have vertical movement, a horizontal arm on the said standard, folding legs connected with the base, and means for holding the said legs in extended position, except when the horizontal arm or extension is moved into a predetermined position, substantially as described.

22. In combination in a supporting apparatus for invalids, a base, a horizontal arm from which the support for the invalid is suspended, folding legs forming part of the base, a rotary standard carrying the horizontal arm, and locking means for the folding legs controlled by the position of the standard, substantially as described.

23. In combination in a supporting apparatus for invalids, a base including folding legs, a standard adapted to have rotary movement, means for supporting the invalid from the said standard, and locking means for the folding legs controlled by the rotary position of the standard, substantially as described.

24. In combination in an apparatus for supporting invalids, a base, folding legs connected therewith, a rotary standard with means suspended therefrom for supporting the invalid, a lever with connections for folding the legs, and locking means for the lever controlled by the circumferential position of the standard, substantially as described.

25. In combination, the base, the rotary standard, means suspended from the standard for holding the invalid, a plate connected with the standard, means for operating the folding legs, means for locking the said operating means, and said locking means being controlled by the rotary plate of the standard, substantially as described.

26. In combination in a supporting apparatus for invalids, a base having the folding legs, a rotary standard with means for suspending the invalid therefrom, a plate adapted to rotate with the standard but held to the base against vertical movement, the said standard being splined to the said plate, an operating lever for the folding legs, and a locking bolt for the lever adapted to enter an opening in the rotary plate for the release of the operating lever, substantially as described.

27. In combination, a base, a rotary standard with means for supporting the invalid therefrom, the folding legs connected with the base, an operating lever for the folding legs, a catch connected with the operating lever and having an inclined projection, a locking bolt coöperating with the inclined projection and controlled by the rotary position of the standard, substantially as described.

28. In combination, the base having a fixed leg 13 and the folding legs, a rotary standard supported by the base having a horizontal arm arranged to normally overlie the fixed leg, and means for locking the folding legs in position excepting when the horizontal arm is in normal position, substantially as described.

29. In connection with the base, the rotary standard with means for supporting the invalid, folding legs carried by the base, and locking means for holding the legs in extended position when the standard is turned from normal position, the said locking means also acting to lock the standard against rotary movement from normal position when the legs are in folded position, substantially as described.

30. In combination in a supporting apparatus for invalids, a standard, means supported thereon for sustaining the invalid, and extensible or collapsible supporting means for the said standard, said supporting means comprising a plurality of legs, and means for operating said legs in unison, substantially as described.

31. In combination, the standard, the support for the invalid carried thereby, a base, collapsible or extensible legs connected with the base, locking means for holding the legs in extended position excepting when the standard and its supporting means is moved to a predetermined position, said locking means then locking the standard and its supporting means in said predetermined position, substantially as described.

32. In combination in a supporting apparatus for invalids, a support for the invalid, a base, collapsible or extensible legs, locking means located at one point and connections extending therefrom to the several legs, substantially as described.

33. In combination in a supporting apparatus for invalids, a support for the invalid, a base, said support being adapted to be turned into different angular positions, collapsible or extensible legs connected with the base, and locking means for holding the extensible legs against movement excepting when the said support is moved into a certain predetermined position in relation to the base, substantially as described.

34. In combination in a supporting apparatus for invalids, a support capable of being turned into different angular positions, a base, collapsible or extensible legs connected with the base, and locking means to hold the support when the legs are collapsed and to hold the legs when the support is moved into certain positions, substantially as described.

35. In combination in a supporting apparatus for invalids, a support capable of being turned into different angular positions, a base, collapsible or extensible legs connected with the base, and a single locking device for alternately locking the collapsible or extensible legs and the support against movement, substantially as described.

36. In combination with the support for the invalid adapted to be turned into different angular positions, a base having collapsible or extensible legs provided with a lever and connections for moving the legs and automatic locking means arranged to lock the lever to hold the legs extended when the support is moved from a predetermined position, substantially as described.

37. In combination with the support for the invalid adapted to be turned into different angular positions, a base having collapsible or extensible legs and automatic means for locking said support in a certain position when the extensible legs are collapsed or moved inwardly, substantially as described.

38. In combination with a standard, a horizontal arm thereon, supporting means for the patient, a swiveled connection between the said supporting means and said horizontal arm to allow the supporting means to turn in a horizontal plane, and means for holding the said supporting means substantially rigid against swiveling in respect to said horizontal arm, substantially as described.

39. In combination in a lifting apparatus for invalids, a standard, an arm supported thereby and arranged to turn in a horizontal plane, a support for the patient below the horizontal arm and a swivel connection between the support and the arm, said swivel connection having bearing portions at points distributed about the axis of the swivel to distribute the strain and prevent the support from tipping out of horizontal position, substantially as described.

40. In combination in a lifting apparatus, the standard, the horizontal arm supported thereby, supporting means for the standard, said standard being adapted to rotate with the arm in relation to the supporting means, the lever connected with the movable legs and provided with locking device and registering pins whereby the standard and arm may be registered in relation to the supporting means, substantially as described.

41. In combination in a lifting apparatus, the rotary standard, having the horizontal arm, extensible supporting means, said standard being adapted to be turned with the arm in relation to the extensible supporting means, locking means to hold the standard against rotation and registering means whereby the standard and arm may be set in relation to the supporting means and locking means, substantially as described.

42. In combination with the standard, a support in which the standard turns, a splined collar on the standard, a head on the said support, said head having a groove with shoulders or stops therein and the collar having a pin to engage the stops and the horizontal arm of the standard for supporting the patient, substantially as described.

43. In combination with a lifting apparatus for invalids, an axle mounted underneath the base at one side thereof, a pair of wheels on said axle, and a pair of legs carrying caster wheels and pivoted to swing in horizontal plane and means connected with the handles for swinging said legs, substantially as described.

44. In combination with a lifting apparatus for invalids, a base, an axle on one side provided with a pair of wheels, and on the other a pair of pivoted legs, carrying wheels, means for operating said legs and a brake arranged to be operated by the attendant, substantially as described.

45. In combination in a lifting apparatus for invalids, a base, an axle on one side provided with a pair of wheels, and on the other a pair of pivoted legs carrying wheels, means for operating the legs, and a brake connected to the handles which operate the legs, substantially as described.

46. In combination in a lifting apparatus for invalids, a base, a vertical movable standard mounted in said base, and means whereby said standard may be raised or lowered, a horizontal arm carried by said standard and adapted to swing in a horizontal plane to move the patient to or from the bed, a frame connected with the arm supported in a horizontal plane, and a support for the patient connected to said frame, substantially as described.

47. In combination in a lifting apparatus for invalids, a base, a vertical movable standard mounted in said base, and means whereby said standard may be raised or lowered, a horizontal arm carried by said standard and adapted to swing in a horizontal plane to move the patient to or from the bed, a block on said arm, a frame supported from the block by swiveled connections which permit the frame to turn in a horizontal plane, and a support for the patient suspended from the frame, substantially as described.

48. In combination in a lifting apparatus for invalids, a block on a horizontal swinging arm, a frame suspended from said block by swiveled connections, means for holding the frame from turning on its swivel and a support for the patient suspended from the frame, substantially as described.

49. In combination in a lifting apparatus for invalids, a vertical standard, an arm thereon adapted to swing in a horizontal plane, a block on said arm, a horizontal frame swiveled to said block and a support for the patient suspended from said frame by flexible connections, substantially as described.

In testimony whereof, I affix my signature in presence of two witnesses.

THOMAS MARSHALL SMITH.

Witnesses:
HENRY E. COOPER,
JAMES M. SPEAR.